United States Patent
Cockfield

(12) 
(10) Patent No.: US 9,511,308 B1
(45) Date of Patent: Dec. 6, 2016

(54) OIL SLUDGE MIXING ASSEMBLY

(71) Applicant: Rosalind R. Cockfield, Moreno Valley, CA (US)

(72) Inventor: Rosalind R. Cockfield, Moreno Valley, CA (US)

( * ) Notice: Subject to any disclaimer, the term of this patent is extended or adjusted under 35 U.S.C. 154(b) by 621 days.

(21) Appl. No.: 14/012,611

(22) Filed: Aug. 28, 2013

(51) Int. Cl.
| B01D 35/00 | (2006.01) |
| B01D 47/00 | (2006.01) |
| B01D 19/00 | (2006.01) |
| B01D 17/02 | (2006.01) |
| B01D 21/04 | (2006.01) |
| B01D 21/00 | (2006.01) |

(52) U.S. Cl.
CPC ........... *B01D 17/0208* (2013.01); *B01D 21/04* (2013.01); *B01D 19/0063* (2013.01); *B01D 21/00* (2013.01); *B01D 21/0003* (2013.01)

(58) Field of Classification Search
None
See application file for complete search history.

(56) References Cited

U.S. PATENT DOCUMENTS

| 3,724,667 | A | * | 4/1973 | McKinney | ............ | B01F 3/0473 |
| | | | | | | 210/195.3 |
| 3,774,770 | A | * | 11/1973 | Sparham | ............ | B01D 21/0012 |
| | | | | | | 210/298 |
| 4,082,227 | A | * | 4/1978 | McGrane | ............ | A01C 23/001 |
| | | | | | | 209/271 |
| 5,364,529 | A | * | 11/1994 | Morin | ............ | C02F 3/04 |
| | | | | | | 210/195.3 |
| 5,562,433 | A | | 10/1996 | Cholet et al. | | |
| 5,660,124 | A | * | 8/1997 | Doncer | ............ | F26B 25/04 |
| | | | | | | 110/227 |
| 5,795,135 | A | | 8/1998 | Nyilas et al. | | |
| 6,391,198 | B1 | | 5/2002 | Porter et al. | | |
| 6,457,950 | B1 | | 10/2002 | Cooper et al. | | |
| 7,011,752 | B2 | * | 3/2006 | Broeders | ............ | B01D 17/0205 |
| | | | | | | 210/221.2 |
| 7,172,688 | B2 | * | 2/2007 | Petersen | ............ | B01D 17/0205 |
| | | | | | | 210/104 |
| 7,377,312 | B2 | | 5/2008 | Davis | | |
| 2007/0065546 | A1 | * | 3/2007 | Jorgensen | ............ | A23B 7/148 |
| | | | | | | 426/316 |
| 2010/0278673 | A1 | | 11/2010 | Kothnur et al. | | |
| 2013/0101982 | A1 | * | 4/2013 | Goodwin | ............ | B01F 7/00691 |
| | | | | | | 435/3 |

* cited by examiner

Primary Examiner — Joseph Drodge
Assistant Examiner — Richard Gurtowski

(57) ABSTRACT

An oil sludge mixing assembly replaces a screw driven oil sludge separator with a hydraulic mixing assembly. The assembly includes a chamber configured to hold a mixture comprising oil, water, and sludge in the interior space. An inlet is coupled to and extends into the chamber wherein the inlet is configured for passing the mixture into the interior space of the chamber. An outlet is coupled to and extends through the chamber wherein the outlet is configured for passing the mixture out of the interior space of the chamber. A housing is coupled to the chamber and an arm is extendably coupled to the housing. A paddle is coupled to the extendable arm such that the paddle is moved within the interior space by the arm for agitating the mixture in the interior space of the chamber and directing settled sludge to the outlet.

8 Claims, 2 Drawing Sheets

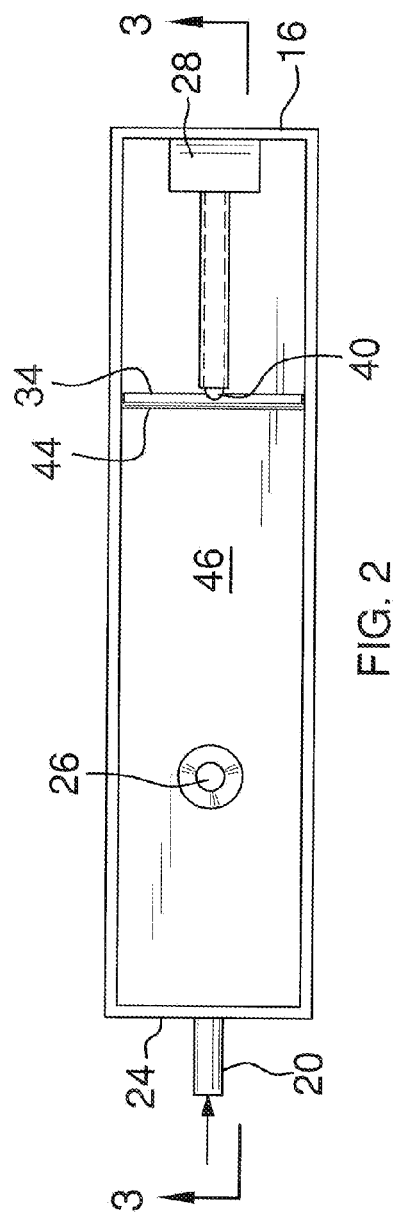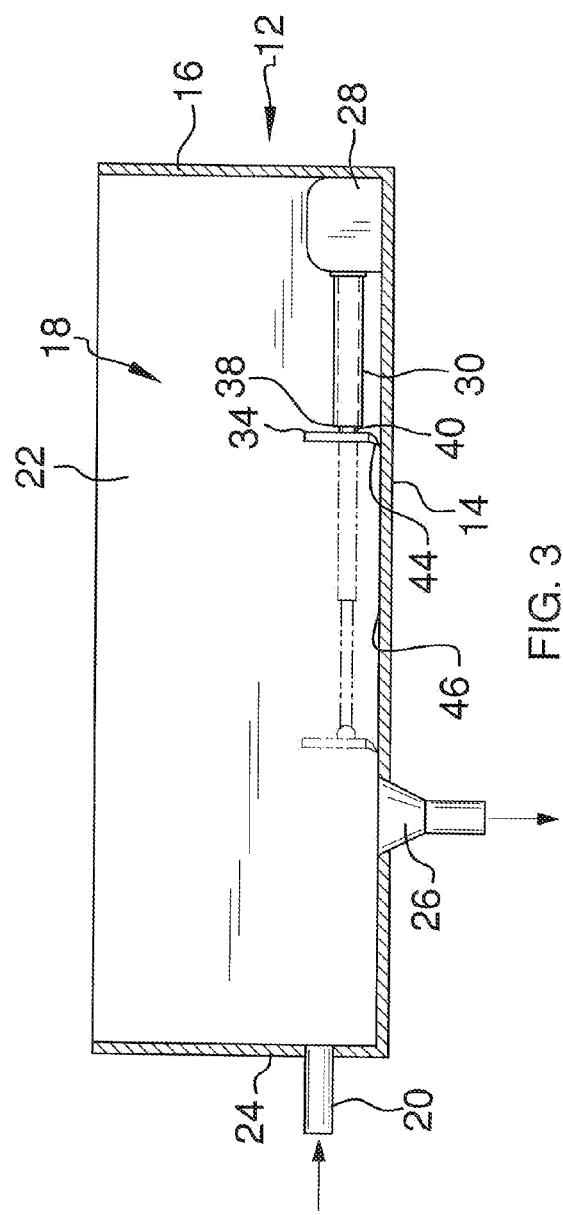

OIL SLUDGE MIXING ASSEMBLY

BACKGROUND OF THE DISCLOSURE

Field of the Disclosure

The disclosure relates to oil separation and mixing devices and more particularly pertains to a new oil separation and mixing device for replacing a screw driven oil sludge separator with a hydraulic mixing assembly.

SUMMARY OF THE DISCLOSURE

An embodiment of the disclosure meets the needs presented above by generally comprising a chamber having a bottom wall and a perimeter wall coupled to and extending upwardly from the bottom wall defining an interior space wherein the chamber is configured to hold a mixture comprising oil, water, and sludge in the interior space. An inlet is coupled to and extends into the chamber wherein the inlet is configured for passing the mixture into the interior space of the chamber. An outlet is coupled to and extends through the chamber wherein the outlet is configured for passing the mixture out of the interior space of the chamber. A housing is coupled to the chamber and an arm is extendably coupled to the housing. A paddle is coupled to the extendable arm such that the paddle is moved within the interior space by the arm for agitating the mixture in the interior space of the chamber and directing settled sludge to the outlet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a cross-sectional view of an embodiment of the disclosure taken along line 3-3 of FIG. 2.

DESCRIPTION OF THE PREFERRED EMBODIMENT

Figure 1:
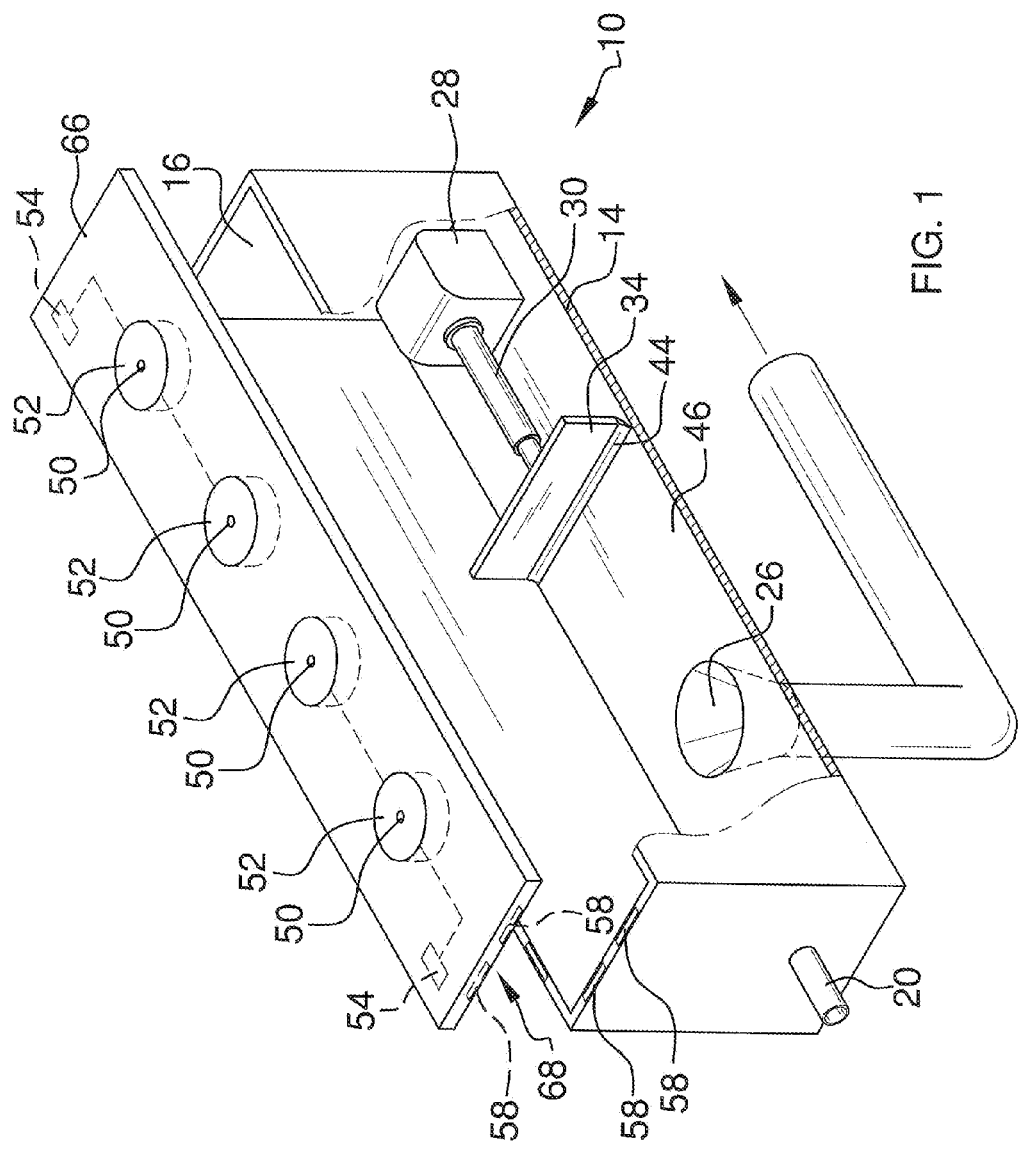
FIG. 1 is a partial cut-away top front side perspective view of a oil sludge mixing assembly according to an embodiment of the disclosure.

With reference now to the drawings, and in particular to FIGS. 1 through 3 thereof, a new oil separation and mixing device embodying the principles and concepts of an embodiment of the disclosure and generally designated by the reference numeral 10 will be described.

As best illustrated in FIGS. 1 through 3, the oil sludge mixing assembly 10 generally comprises a chamber 12 having a bottom wall 14 and a perimeter wall 16 coupled to and extending upwardly from the bottom wall 14 defining an interior space 18. Thus, the chamber 12 is configured to hold a mixture 22 comprising oil, water, and sludge in the interior space 18. An inlet 20 is coupled to and extends into the chamber 12 wherein the inlet 20 is configured for passing the mixture 22 into the interior space 18 of the chamber 12. The inlet 20 is positioned on and extends through the perimeter wall 16 of the chamber 12 on a first end 24 of the chamber 12. An outlet 26 is coupled to and extends through the chamber 12 wherein the outlet 26 is configured for passing the mixture 22 out of the interior space 18 of the chamber 12. The outlet 26 is positioned on and extends through the bottom wall 14 of the chamber 12.

A housing 28 is coupled to the chamber 12 and positioned in the interior space 18. An arm 30 is coupled to the housing 28 and extendable from the housing 28. The arm 30 extends outwardly from the housing 28 towards the outlet 26. The arm 30 is hydraulically extended and retracted from the housing 28 to inhibit breakdown of the arm from exposure to the mixture 22. A paddle 34 is coupled to the extendable arm 30. The paddle 34 is coupled to a distal end 38 of the arm 30 relative to the housing 28 such that the paddle 34 is moved within the interior space 18 towards the first end 24 of the chamber 12 as the arm 30 extends from the housing 28. The paddle 34 is urged by the arm 30 such that the paddle 34 is configured for agitating the mixture 22 in the interior space 18 of the chamber 12. A swivel joint 40 couples the paddle 34 to the distal end 38 of the arm 30. A bottom edge 42 of the paddle 34 may be a squeegee abutting an upper surface 44 of the bottom wall 14 such that the bottom edge 44 of the paddle 34 scrapes along the upper surface 44 of the bottom wall 14 when the arm 30 is extended from the housing 28. Thus, the paddle 34 is configured for urging settled sludge towards the outlet 26.

A lid 66 may be coupled to the chamber 12 enclosing the interior space 18. The lid 66 may be selectively magnetically coupled to the chamber 12 by magnets 58 to facilitate removal of the lid 66 when desired while providing a substantially airtight seal when coupled to the chamber 12. The magnets 58 may be positioned on a rim 68 of the lid 66 with corresponding magnets 58 or metallic members in the perimeter wall 16. A power mechanism may be applied in conventional manner such that the magnets 58 are electrically activated. A plurality of spaced blowers 50 may be coupled to the lid 66 and extended along a length of the lid in spaced arrangement. Each blower 50 is in environmental communication with an exhaust 52 for venting vapor from the chamber 12. A sensor 54 of conventional fashion may be coupled to the lid 66 in communication with the interior space 18. The sensor 54 detects vapors within the interior space 18 of the chamber 12 and is operationally coupled to each blower 50 for venting the vapors from the chamber 12 when the sensor 54 detects a vapor concentration over a threshold vapor concentration.

In use, the assembly 10 replaces a conventional oil, sludge, water separator utilizing a belt driven mechanism as is conventionally used in oil refineries. The assembly 10 receives the mixture 22 into the chamber 12. The mixture 22 inherently experiences separation of oil, sludge, and water. The sludge settles on the upper surface 44 of the bottom wall 14 of the chamber 12. The arm 30 is periodically extended from the housing 28 to urge the settled sludge to the outlet 26 and further provides re-mixing of the mixture 22 to prevent clogging of the mixture 22. The outlet 26 is in fluid communication with conventional systems to further process the mixture 22 after being re-mixed within the chamber 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An oil sludge mixing assembly for replacing an oil sludge separator in an oil refinery, the assembly comprising:
   a chamber having a bottom wall and a perimeter wall coupled to and extending upwardly from said bottom wall defining an interior space wherein said chamber is configured to hold a mixture comprising oil, water, and sludge in said interior space;
   an inlet coupled to and extending into said chamber wherein said inlet is configured for passing the mixture into said interior space of said chamber;
   an outlet coupled to and extending through said chamber wherein said outlet is configured for passing the mixture out of said interior space of said chamber, said outlet being positioned on and extending through said bottom wall of said chamber;
   a housing coupled to and positioned in said chamber;
   an arm coupled to said housing, said arm being extendable from said housing;
   a paddle coupled to said extendable arm wherein said paddle is moved linearly and parallel to said bottom wall within said interior space by said arm such that said paddle is configured for agitating the mixture in said interior space of said chamber;
   a lid coupled to said chamber;
   a blower coupled to said lid, said blower being in environmental communication with an exhaust for venting vapor from said chamber;
   said lid being magnetically coupled to said chamber; and
   a sensor coupled to said lid, said sensor detecting vapors within said interior space of said chamber, said sensor being operationally coupled to said blower for venting the vapors from said chamber when said sensor detects a vapor concentration over a threshold vapor concentration.

2. The assembly of claim 1, further comprising said paddle being coupled to a distal end of said arm relative to said housing.

3. The assembly of claim 2, further comprising said arm extending outwardly from said housing towards said outlet.

4. The assembly of claim 3, further comprising a swivel joint coupling said paddle to said distal end of said arm.

5. The assembly of claim 1, further comprising a bottom edge of said paddle abutting an upper surface of said bottom wall such that said bottom edge of said paddle scrapes along said upper surface of said bottom wall when said arm is extended from said housing wherein said paddle is configured for urging settled sludge towards said outlet.

6. The assembly of claim 1, further comprising said arm being hydraulically extended from said housing.

7. The assembly of claim 1, further comprising said inlet being positioned on and extending through said perimeter wall of said chamber.

8. An oil sludge mixing assembly for replacing an oil sludge separator in an oil refinery, the assembly comprising:
   a chamber having a bottom wall and a perimeter wall coupled to and extending upwardly from said bottom wall defining an interior space wherein said chamber is configured to hold a mixture comprising oil, water, and sludge in said interior space;
   an inlet coupled to and extending into said chamber wherein said inlet is configured for passing the mixture into said interior space of said chamber, said inlet being positioned on and extending through said perimeter wall of said chamber;
   an outlet coupled to and extending through said chamber wherein said outlet is configured for passing the mixture out of said interior space of said chamber, said outlet being positioned on and extending through said bottom wall of said chamber;
   a housing coupled to and positioned in said chamber;
   an arm coupled to said housing, said arm being extendable from said housing, said arm extending outwardly from said housing towards said outlet, said arm being hydraulically extended from said housing;
   a paddle coupled to said extendable arm wherein said paddle is moved linearly and parallel to said bottom wall within said interior space by said arm such that said paddle is configured for agitating the mixture in said interior space of said chamber, said paddle being coupled to a distal end of said arm relative to said housing;
   a swivel joint coupling said paddle to said distal end of said arm;
   a bottom edge of said paddle abutting an upper surface of said bottom wall such that said bottom edge of said paddle scrapes along said upper surface of said bottom wall when said arm is extended from said housing wherein said paddle is configured for urging settled sludge towards said outlet;
   a lid coupled to said chamber, said lid being selectively magnetically coupled to said chamber;
   a blower coupled to said lid, said blower being in environmental communication with an exhaust for venting vapor from said chamber; and
   a sensor coupled to said lid, said sensor detecting vapors within said interior space of said chamber, said sensor being operationally coupled to said blower for venting the vapors from said chamber when said sensor detects a vapor concentration over a threshold vapor concentration.

* * * * *